US008453247B2

(12) United States Patent
Jeong et al.

(10) Patent No.: US 8,453,247 B2
(45) Date of Patent: May 28, 2013

(54) APPARATUS, SYSTEM AND METHOD FOR PROVIDING SECURITY SERVICE IN HOME NETWORK

(75) Inventors: Tae-jin Jeong, Seoul (KR); Hyun-gyoo Yook, Seoul (KR); Sung-min Lee, Seoul (KR); Se-hee Han, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 966 days.

(21) Appl. No.: 11/246,666

(22) Filed: Oct. 11, 2005

(65) Prior Publication Data

US 2006/0079231 A1 Apr. 13, 2006

(30) Foreign Application Priority Data

Oct. 9, 2004 (KR) .................. 10-2004-0080704

(51) Int. Cl.
*H04L 29/00* (2006.01)
(52) U.S. Cl.
USPC ............. 726/26; 713/193; 380/231; 380/232; 380/233
(58) Field of Classification Search
USPC ................... 380/231, 232, 233; 713/193
See application file for complete search history.

(56) References Cited

U.S. PATENT DOCUMENTS

| 5,572,438 | A | * | 11/1996 | Ehlers et al. | 700/295 |
|---|---|---|---|---|---|
| 5,706,338 | A | * | 1/1998 | Relyea et al. | 379/189 |
| 6,449,350 | B1 | * | 9/2002 | Cox | 379/134 |
| 6,792,536 | B1 | * | 9/2004 | Teppler | 713/178 |
| 6,948,070 | B1 | * | 9/2005 | Ginter et al. | 713/193 |
| 7,039,945 | B2 | * | 5/2006 | Vinati et al. | 726/2 |
| 7,308,431 | B2 | * | 12/2007 | Asokan et al. | 705/67 |
| 7,664,952 | B2 | * | 2/2010 | Eguchi et al. | 713/168 |
| 2002/0013909 | A1 | | 1/2002 | Baumeister et al. | |
| 2002/0027992 | A1 | * | 3/2002 | Matsuyama et al. | 380/231 |
| 2002/0099836 | A1 | * | 7/2002 | Vinati et al. | 709/229 |
| 2003/0028656 | A1 | * | 2/2003 | Babka | 709/229 |
| 2003/0088780 | A1 | | 5/2003 | Kuo et al. | |
| 2004/0260630 | A1 | * | 12/2004 | Benco et al. | 705/30 |

FOREIGN PATENT DOCUMENTS

| JP | 11150707 A | 6/1999 |
|---|---|---|
| JP | 2001-103078 A | 4/2001 |
| JP | 2001268462 A | 9/2001 |
| JP | 2004096294 A | 3/2004 |
| KR | 1999-0084415 A | 12/1999 |
| KR | 10-2001-0055222 A | 7/2001 |
| KR | 2003-0003593 A | 1/2003 |
| KR | 10-2003-0073807 A | 9/2003 |
| KR | 10-2004-0014731 A | 2/2004 |
| WO | WO 02/23367 A1 | 3/2002 |

* cited by examiner

*Primary Examiner* — Jeffrey Pwu
*Assistant Examiner* — Helai Salehi
(74) *Attorney, Agent, or Firm* — Sughrue Mion, PLLC (57) ABSTRACT

Provided are apparatuses, systems and methods for providing security services. The apparatus includes a network interface unit for transceiving data between a control device and a management device, a controller for controlling provision of services requested from the control device through the network interface unit when a permit time, during which a target of security service is allowed to be given services, is longer than a used time, during which predetermined services are provided to the target of security service, and a used time processing unit for updating the used time by reflecting time during which the services are provided. When security services are performed, services of a controlled device can be provided during the permitted time according to a user or a control device.

21 Claims, 9 Drawing Sheets

APPARATUS, SYSTEM AND METHOD FOR PROVIDING SECURITY SERVICE IN HOME NETWORK

CROSS-REFERENCE TO RELATED APPLICATIONS

This application claims priority from Korean Patent Application No. 10-2004-0080704 filed on Oct. 9, 2004 in the Korean Intellectual Property Office, the disclosure of which is incorporated herein in its entirety by reference.

BACKGROUND OF THE INVENTION

1. Field of the Invention

Apparatuses, systems and methods consistent with the present invention relate to provision of security services. More particularly, the present invention relates to an apparatus, a system, and a method that provides a service that is requested from a control device based on permit time set in a controlled device.

2. Description of the Related Art

In general, a variety of network devices in a private network based on the Internet Protocol (hereinafter, referred to as "IP") provide a variety of applications under a computing environment constructed through middleware.

The network devices are interconnected by a peer-to-peer mechanism using a variety of middleware, such as home audio/video interoperability (HAVI), Universal Plug and Play Control Device (UPnP), Java Intelligent Network Infra-structure (Jini), and LonWorks.

Network devices may construct a network using the middleware, and each network device constituting the network is connected to a virtual computing environment, to thereby provide users with various services that can be adapted to the application(s) of the network device.

Network devices can be classified into network devices (hereinafter, referred to as "Control Devices or Control Points" and abbreviated as "CPs") that control other network devices and regular network devices (hereinafter, referred to as "Controlled Devices" and abbreviated as "CDs") that provide services specific to their particular applications according to the direction of the control device.

A control device may restrict a user from using some services of a controlled device. For such a restriction, specific security services have been suggested. An access control list (ACL), which indicates access rights a control device has to a controlled device and restrictions on using services permitted to the control device, has been used in conventional security services. The ACL is stored in the controlled device and can only be edited by a specific network device called a security console (SC).

Accordingly, the controlled device may securely provide designated services to an authorized control device.

Since conventional security services are provided to a control device, which requests the services from the controlled device, rather than to users who intend to use the controlled device on a home network, the conventional method is not designed around users. Especially, if a network system requiring a parental control function adopts the conventional method, a network manager has to individually manage the control devices, which is inconvenient for the network manager.

Accordingly, there is a demand for a technology whereby access rights for a controlled device are managed by each user who desires to be supplied with services from the controlled device.

Further, an access control technology is required based on temporal restrictions for various security services.

Korean Unexamined Patent Publication No. 2001-0055222 discloses "A method for notifying use of exceeding the time limit in an always on/dynamic ISDN (AO/DI) service," comprising inspecting whether the accumulated time of use exceeds the time limit when an Internet subscriber requests a connection to the Internet, and generating information regarding excessive time in a connection message and transmitting it to the subscriber if the accumulated time of use exceeds the time limit. However, this publication discloses only control of a specific network device used by the subscriber. Further, when a plurality of users uses a single network device, connection by each user cannot be controlled. Korean Patent Publication No. 2001-0055222 also does not disclose access control for various services provided between network devices in a home network.

SUMMARY OF THE INVENTION

An object of the present invention is to control access by each user to a controlled device on a network system.

Another object of the present invention is to control so that services of a controlled device are provided according to the accumulated time permitted by each user or each control.

The present invention is not limited to the object described above, and any other objects not described herein can be comprehended by those in the art from the following disclosure.

According to an aspect of the present invention, there is provided a method for providing security services, comprising receiving a request to provide services for a control device, comparing a permit time available for provision of services relative to a target of security service and used time which is an accumulative value of time during which predetermined services are provided to the target of security service, providing services requested from the control device when the permit time is longer than the used time, and updating the used time by reflecting the used time during which the services requested by the control device are provided.

A method for providing security services according to an exemplary embodiment of the present invention, comprising requesting, by a control device, a controlled device to provide services, comparing, by the controlled device that received the request to provide services, permit time for provision of services to a target of security service and used time which is an accumulative value of time during which predetermined services are provided to the target of security service, providing, by the controlled device, services requested from the control device if the permit time is longer than the used time, and updating, by the controlled device, the used time by reflecting the time during which the services requested by the control device are provided.

An apparatus for providing security services according to an exemplary embodiment of the present invention, comprising a network interface unit transceiving data between a control device and a management device, a controller for controlling provision of services requested from the control device through the network interface unit when a permit time during which a target of security service is allowed to be given services is longer than used time which is an accumulative value of time during which predetermined services are provided to the target of security service, and a used time processing unit updating the used time by reflecting time during which the services are provided.

A system for providing security services according to an exemplary embodiment of the present invention, comprising a control device requesting services, a controlled device providing the services requested from the control device when a permit time during which a target of security service is allowed to be provided services is longer than used time which is an accumulative value of time during which predetermined services are provided to the target of security service and updating the used time by reflecting the time during which the services requested by the control device are provided, and a management device setting the permit time to the controlled device.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Advantages and features of the present invention and methods of accomplishing the same may be understood more readily by reference to the following detailed description of the preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will be described based on a home network system as a typical example of a predetermined local network, but the present invention is not limited to the home network system. A network system consisting of a management device, a control device, and a controlled device described with respect to the present invention is also included in the scope of the present invention. The management device, control device, and controlled device of the present invention are based on the home network environment using UPnP middleware, but this is merely exemplary. It will be understood by those skilled in the art that various modifications, changes and other embodiments equivalent thereto by functions of network devices are available as far as they are recognizable by middleware of dynamic mechanisms such as Jini, HAVi, and HWW as well as UPnP.

Figure 1:
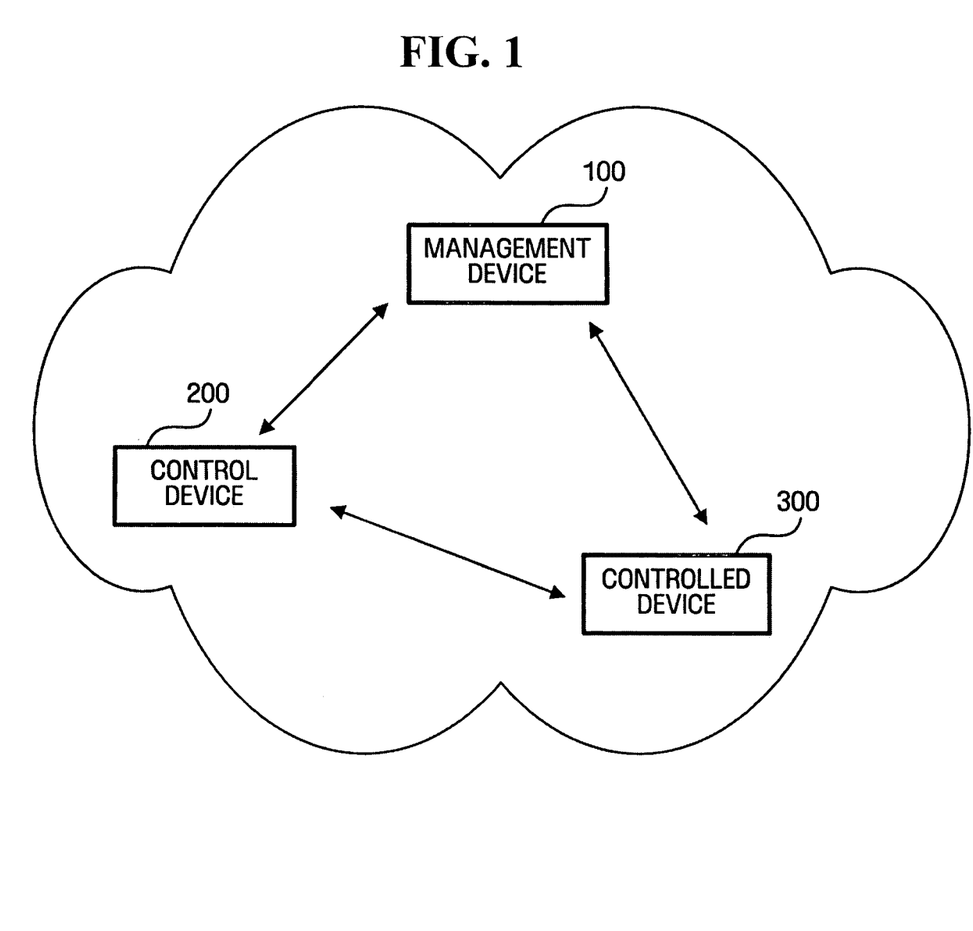
FIG. 1 illustrates a home network system according to an exemplary embodiment of the present invention.

Hereinafter, exemplary embodiments of the present invention will be described in detail with reference to the accompanying drawings FIG. 1 illustrates a home network system according to an exemplary embodiment of the present invention.

As illustrated, the home network system comprises a management device 100, a control device 200, and a controlled device 300. At least one of each of the management device 100, the control device 200, and the controlled device 300 is included in the same home network.

According to the present embodiment, the controlled device 300 stores therein information regarding the control device 200 and access control information to provide services requested by the control device 200. The access control information includes the maximum time (hereinafter, referred to as "permit time") during which services are provided at the request of the control device, which will be described in FIG. 3.

When services are requested from the control device 200, the controlled device 300 controls provision of services according to the access control information. Especially, the controlled device 300 according to the present invention may provide services requested by the control device 200 within the permit time included in the access control information. The access control information can be edited by the management device 100 in the conventional manner. That is, the management device 100 may set new access control information and store it in the controlled device 300, or delete or modify the existing access control information.

When a list of this access control information is used, provision by the controlled device 300 of services may be controlled per control device, per user, and per user group (hereinafter, collectively referred to as 'target of security service'). According to this method, security services may be provided on an individual basis.

According to another exemplary embodiment of the present invention, when services are requested by the control device 200, the controlled device 300 may receive a confirmation about how much time is left to provide services at the request of the control device 200 from the management device 100. As a result of a confirmation from the management device 100, the controlled device 300 may determine whether to provide the services requested by the control device 200. Following this method, security services for a plurality of controlled devices in the home network may be comprehensively provided.

Figure 2:
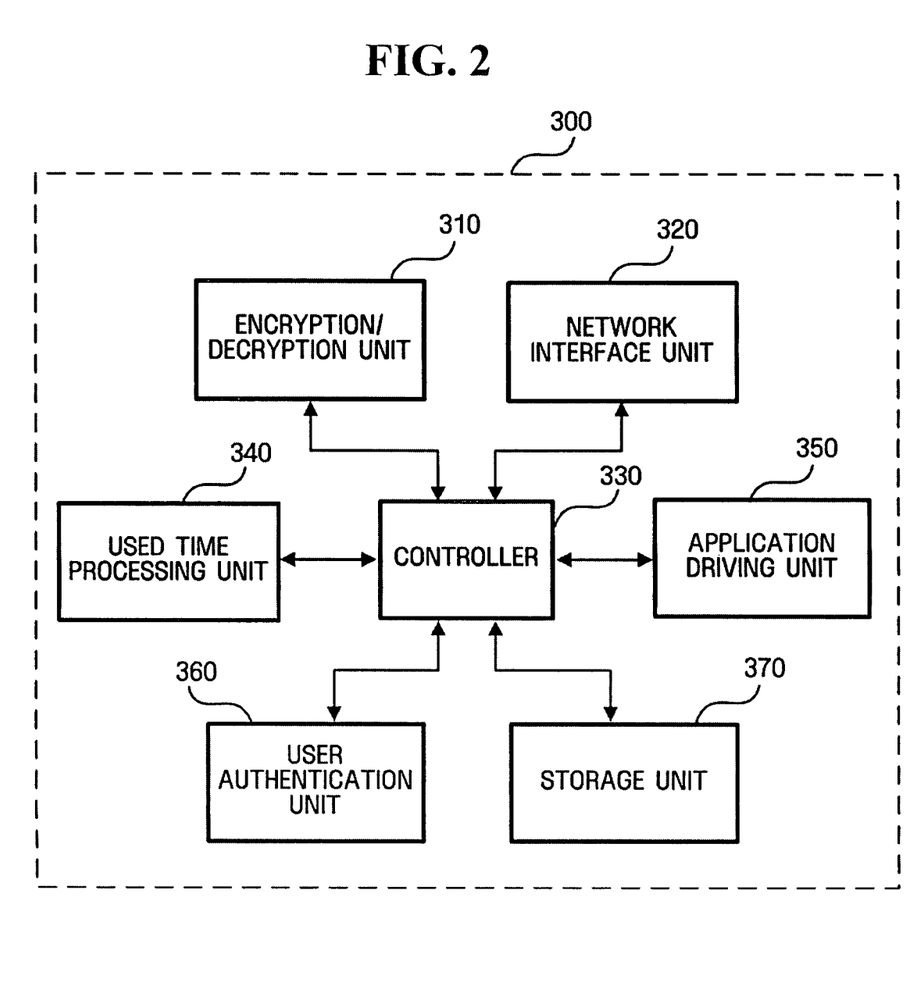
FIG. 2 is a block diagram illustrating a controlled device 300 according to an exemplary embodiment of the present invention.

FIG. 2 is a block diagram illustrating a controlled device 300 according to an exemplary embodiment of the present invention.

As illustrated, the controlled device comprises an encryption/decryption unit 310, a network interface unit 320, a controller 330, a used time processing unit 340, an application driving unit 350, a user authentication unit 360, and a storage unit 370.

The encryption/decryption unit 310 encrypts data to be transmitted to the management device 100 or the control device 200 according to control by the controller 330, or it decrypts the data encrypted and transmitted by the management device 100 or the control device 200.

The encryption/decryption unit 310 may perform the encryption and decryption by a secret key cryptography as well as by a public key cryptography, and there may be one or more encryption/decryption units for performing both cryptographies. Public key cryptography is used for communication security while the communication session with the management device 100 or the control device 200 is established. Secret key cryptography is used for communication security after the communication session has been established, and the key used for this is a session key generated as a result of establishing the communication session.

The network interface unit 320 transceives data with the management device 100 or the control device 200 by means of a wired or wireless transmission medium.

The controller 330 controls communication with the management device 100 and the control device 200. When services are requested by the control device 200, the controller 330 searches the storage unit 370 for access control information regarding the control device 200 that has requested the services. At this time, the controller 330 controls the application driving unit 350 to thereby provide the services requested by the control device 200 within the range permitted based on the searched access control information.

The controller 330 may also control provision of services to a user of the control device 200 as well as to the control device 200. When a user who requests the services to be provided via the control device 200 is identified as an authentic user by the user authentication unit 360, the controller 330 searches the storage unit 370 for access control information regarding the identified user, and controls provision of services according to the access control information.

The controller 330 may also control provision of services per user group (which consists of one or more users). For example, when information on the user group to which each user belongs is also included in a user information file stored in the storage unit 370, the controller 330 may search the storage unit 370 for access control information on the user group to which the user authenticated by the user authentication unit 360 belongs, and control provision of services according to the access control information.

According to another exemplary embodiment of the present invention, the controller 330 may request predetermined time information from the management device 100, and also control provision of services requested via the control device 200 according to the time information transmitted from the management device 100.

The used time processing unit 340 measures the time services are provided through the application driving unit 350 and updates the used time stored in the storage unit 370 to reflect the measured time. Updating of the used time may be performed after provision of services are completed or periodically in the course of providing services.

According to another exemplary embodiment of the present invention, when the predetermined time information required to control provision of services is transmitted from the management device 100, the used time processing unit 340 may request the management device 100 to update the used time via the interface unit 320.

The application driving unit 350 provides services requested by the control device 200 according to control by the controller 330. For example, when the controlled device 300 refers to a DVD player, the application driving unit 350 may play a moving picture file.

When the target of security service is a user, the user authentication unit 360 authenticates the user who requests the service. For example, when the user inputs user authentication information (for example, a user identification and a password) through the control device 200 and the network interface unit 320 receives the user authentication information from the control device 200, the user authentication unit 360 of the controlled device 300 determines whether the user is authentic based on the user information file stored in the storage unit 370. When the user is determined to be authentic, the controller 330 searches the storage unit 370 for access control information about the concerned user, and controls provision of the service according to the access control information.

Figure 3:
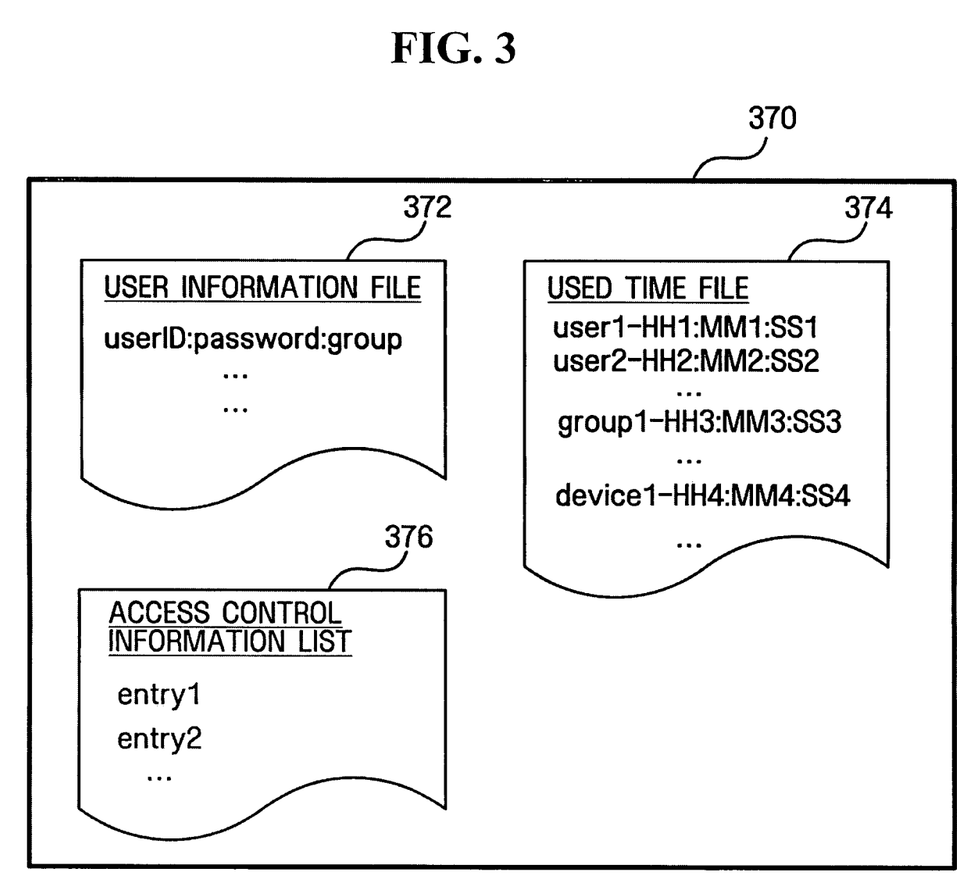
FIG. 3 illustrates data stored in a storage unit of a controlled device according to an exemplary embodiment of the present invention.

The storage unit 370 stores a user information file, a used time file, and an access control information list, which will be described with reference to FIG. 3.

The user information file 372 includes data required to authenticate a user. For example, the user information file may comprise a user identification, a password, and a user group identifier to identify a user group to which the user belongs.

Used time, which is an accumulative value of time during which services are provided to each target of security service (user, user group, and control device), is recorded in the used time file 374. The used time is updated by the used time processing unit 340 as services are provided through the application driving unit 350. The used time may be recorded by a user, user group or control device. The controller 330 uses the used time to determine whether the application driving unit 350 should continue to provide services.

For example, when a user A requests the controlled device 300 to provide a service via a control device, the controller 330 compares permit time included in the access control information on the user A with used time of the user A included in the used time file 374. If the permit time is longer than the used time, the controller 330 directs the application driving unit 350 to provide the service requested by the user A.

The access control information list 376 comprises access control information about each target of security services. The access control information list will be described with reference to FIG. 4.

Figure 4:
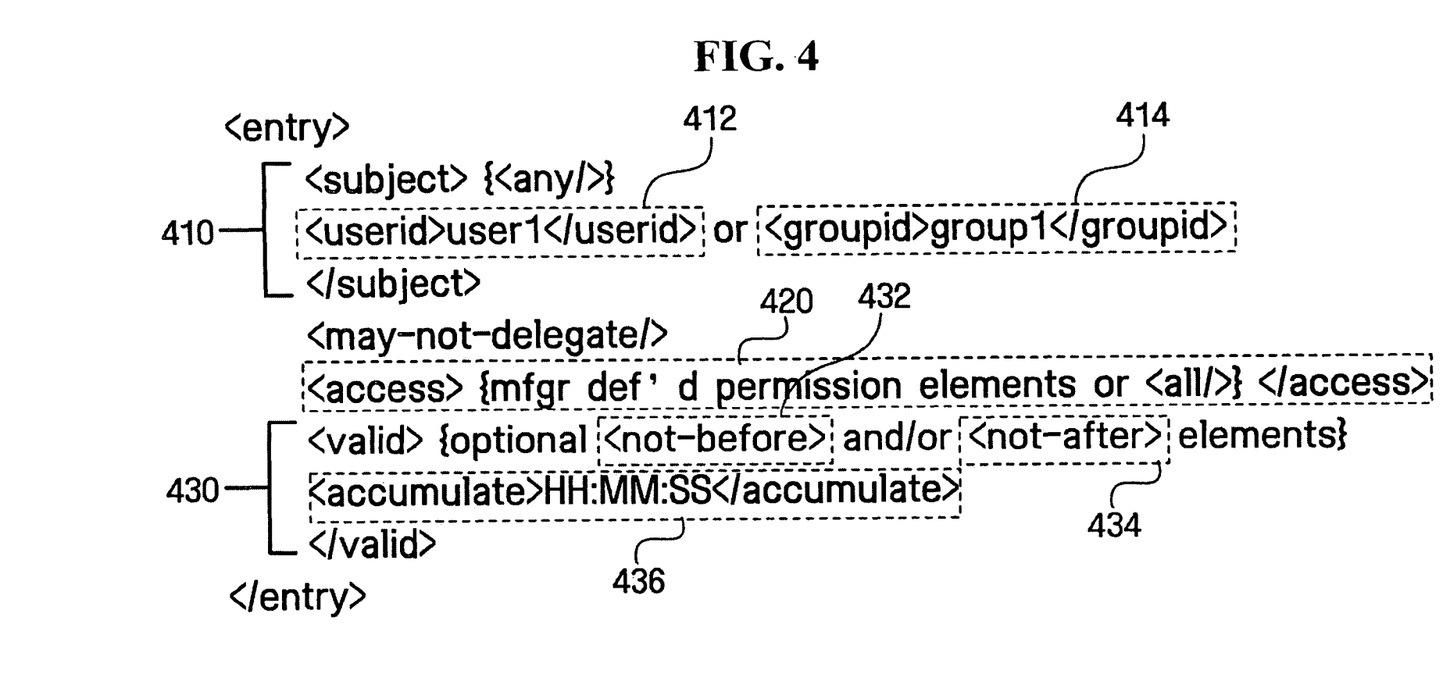
FIG. 4 illustrates entries composing an ACL, which is written in XML, according to an exemplary embodiment of the present invention.

FIG. 4 illustrates an entry of an ACL, which is written in XML, according to an exemplary embodiment of the present invention.

The entry is access control information about each target of security services.

In the illustrated XML document, a subject tag 410 is used to identify the control device 200 requesting the services. Accordingly, identification information of the control device 200, such as a public key and address of the control device 200 is included in the subject tag 410.

A user ID tag 412 within the subject tag 410, which is a new addition of the present invention, is used to identify the user who wants to use the services. Accordingly, identification information of the user is included in the user ID tag 412.

A group ID tag 414, which is a new addition of the present invention, is used to identify the user group to which the user who wants to use the services belongs. Accordingly, identification information to identify the user group is included in the group ID tag 414.

Accordingly, the controlled device 300 according to an exemplary embodiment of the present invention may control the provision of services per control device, per user who wants to use the services through the control device, and per user group to which the user belongs.

An access tag 420 represents service control information which may be used by a target of security service identified based on the subject tag 410, user ID tag 412, or the group ID tag 414. For example, when the controlled device refers to an audio apparatus, the service control information may be directed to use and control of services provided by the controlled device, such as play, stop/pause, volume control, and downloading of a music file. The controller 330 can determine what kind of services that the target of security services may use through the access tag 420. When receiving a request for services not set in the access tag 420, the controller 330 may output an error message or not respond to the request.

A valid tag 430 is used to control a time period during which services are available for use. For example, in case of the not-before tag 432, the valid tag 430 can prevent services from being used before the date set in the not-before tag 432. Likewise, in case of the not-after tag 434, the valid tag 430 can prevent services from being used after the date set in the not-after tag 432.

An accumulate tag 436 within the valid tag 430, which is a new addition of the present invention, is used to set a permit time available for using services. For example, when 10 hours are set in the accumulate tag 436, a control device identified by the subject tag 410, a user identified by the user ID tag 412, or a user group identified by the group ID tag 414 is allowed to use services of the controlled device 300 for 10 hours.

The accumulate tag 436 may be used with the not-before tag 432 or the not-after tag 434. In this case, services may be provided during the permit time set based on the accumulate tag 436 within the period set based on the not-before tag 432 or the not-after tag 434.

An ACL 376 comprises an entry for each target of security services.

The storage unit 370 may store private/public key pairs. The private key and the public key are used for public key cryptography performed by the encryption/decryption unit 310.

Figure 5:
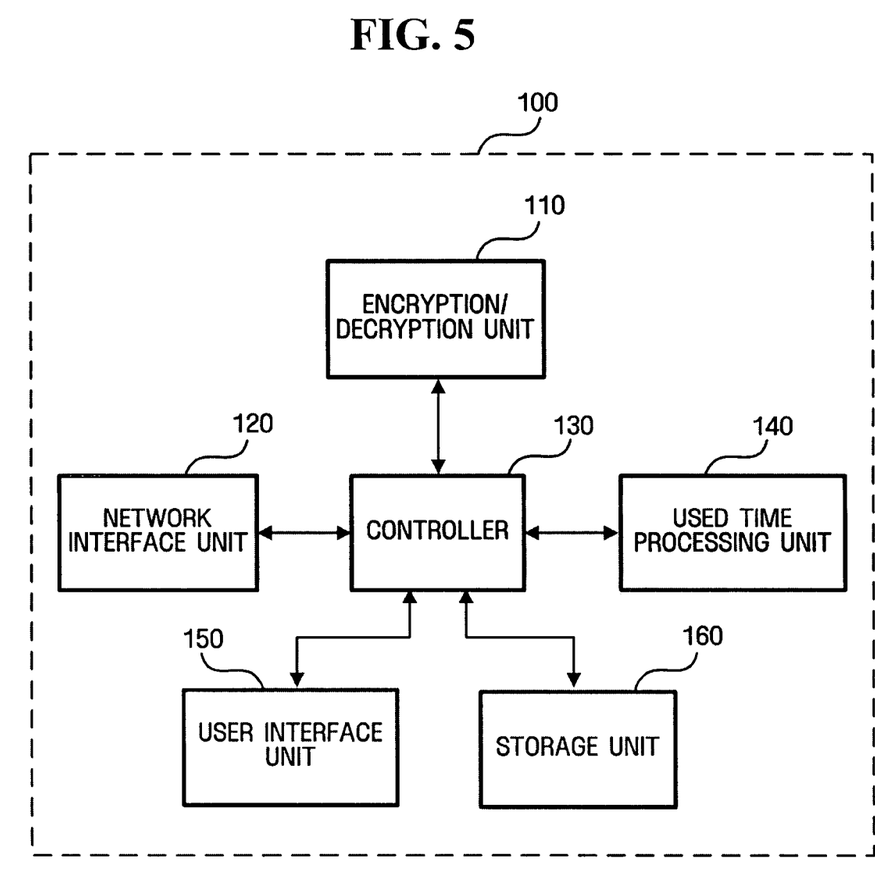
FIG. 5 is a block diagram illustrating a management device according to an exemplary embodiment of the present invention.

FIG. 5 is a block diagram illustrating a management device according to an exemplary embodiment of the present invention.

As illustrated, the management device 100 comprises an encryption/decryption unit 110, a network interface unit 120, a controller 130, a used time processing unit 140, a user interface unit 150, and a storage unit 160.

The encryption/decryption unit 110 encrypts data transmitted to the control device 200 or the controlled device 300 according to control by the controller 330, or it decrypts the encrypted data received from the control device 200 or the controlled device 300. Through this encryption and decryption, the security of the communication with the control device 200 or the controlled device 300 can be enhanced.

The encryption/decryption unit 110 may perform the encryption and decryption by a secret key cryptography as well as by a public key cryptography. There may be one or more encryption/decryption units for performing both cryptographies. Public key cryptography is used for communication security while a communication session with the control device 200 or the controlled device 300 is established. Secret key cryptography is used for communication security after a communication session has been established, and the key used for this is a session key generated as a result of establishing a communication session.

The network interface unit 120 performs communication with the control device 200 or the controlled device 300 through a wired or wireless transmission medium.

The controller 130 controls communication with the control device 200 or the controlled device 300. The controller 130 may edit access control information stored in the controlled device 300. Editing of the access control information implies deletion or modification of the existing access control information or addition of new access control information. The access control information according to an exemplary embodiment of the present invention was described with reference to FIGS. 3 and 4.

When a request for time information with respect to a target of security service is received from the controlled device 300, the controller 130 searches for permit time and used time stored in the storage unit 160 and transmits them to the controlled device 300 via the network interface unit 120. As another exemplary embodiment of the present invention, when a request for time information is received from the controlled device 300, the controller 130 may transmit the difference between the permit time and the used time. The difference value refers to the residual time allowed for the controlled device 300 to provide services to the target of security service.

When the time during which services are provided to the target of security service and a request for updating used time are received from the controlled device 300, the used time processing unit 140 updates used time related to the target of security service by reflecting the used time in the storage unit 160.

Access control information on providing services of a certain controlled device is input by a user into the user interface unit 150. That is, the user may set the permit time related to the target of security service via the user interface unit 150 or edit an ACL stored in the controlled device 300. For example, when parents would like to control their children's use of the controlled device 300, they set a user id, which can identify their child, as a target of security service and permit time for use of the services of the controlled device 300. By doing this, when their child intends to use services of the controlled device 300 via the control device 200, he/she is requested to input, his/her user id whereby he/she may be given access to services within the permit time. As another example, when parents set an identifier of the control device exclusively used only by their child as a target of security service and permit time at the same time, their child may be given services from the controlled device by using the control device during the permit time.

The storage unit 160 stores used time and permit time related to each target of security services. The used time is the total amount of time that a target of security service has been given services through each controlled device in a home network and the permit time may be the total amount of time during which the target of security service is allowed to be given services through each controlled device in the home network.

For example, when a certain user is given services for one hour through a first controlled device in the home network and for three hours through a second controlled device, the used time for the concerned user adds up to four hours. If the permit time with respect to the user is set to five hours in the storage unit 160 of the management device 100, the user may be given services for one more hour through the first control device, the second device, or another control device in the home network.

Figure 6:
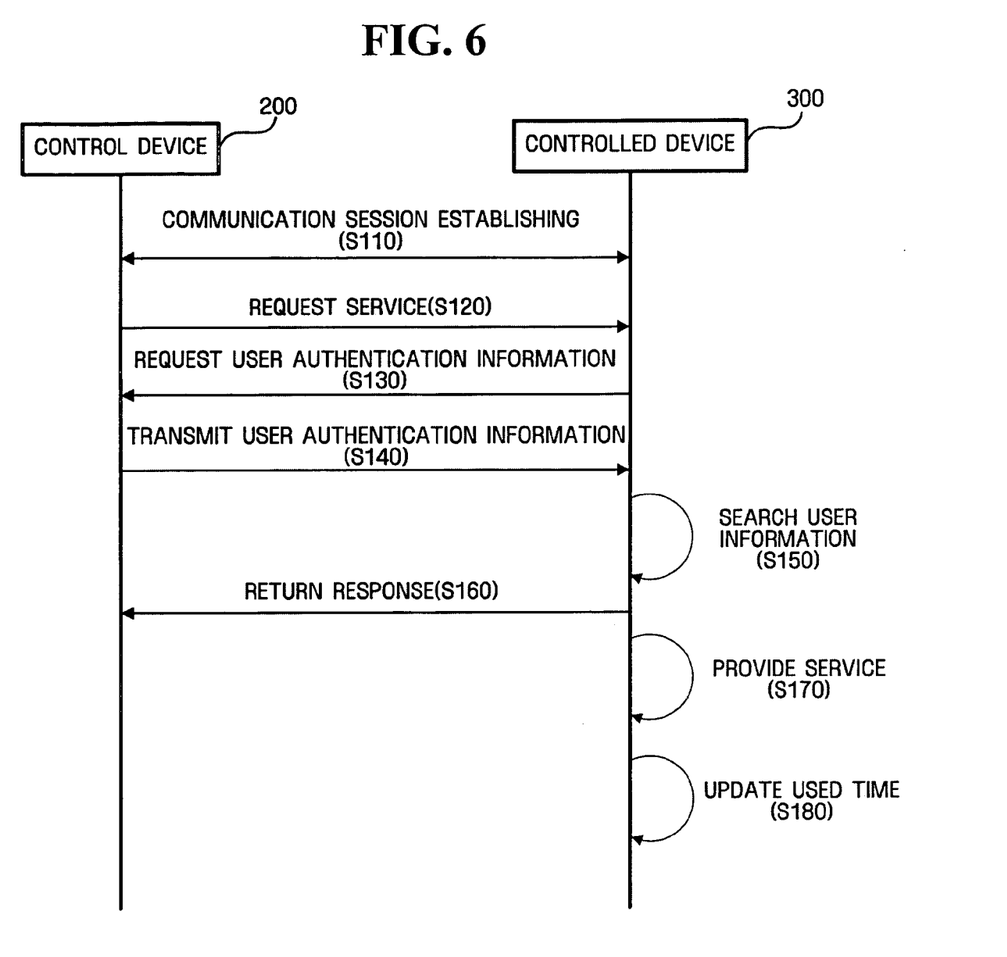
FIG. 6 is a flowchart illustrating the provision of security services according to an exemplary embodiment of the present invention.

FIG. 6 is a flowchart illustrating provision of security services according to an exemplary embodiment of the present invention.

Initially, a series of processes to establish a communication session between the control device 200 and the controlled device 300 may be performed (S110). This process for establishment of a communication session may be embodied according to the conventional art.

When a user requests services from the controlled device 300 via the control device 200 (S120), the user authentication unit 360 of the controlled device 300 requests user identification information from the control device 200 if the user authentication information is required (S130).

At this time, the control device 200 transmits the user authentication information input by the user (for example, the user id and password described above) to the controlled device 300 (S140).

The user authentication unit 360 of the controlled device 300 that receives user authentication information from the control device 200 searches the user information file stored in the storage unit 370 (S150) for the user information that matches the user authentication information received from the control device 200.

When user information that matches the user authentication information transmitted from the control device 200 is found, the user authentication unit 360 notifies the control device 200 that user authentication is completed (S160). If user information that matches the user authentication information transmitted from the control device 200 is not found, the user authentication unit 360 may notify the control device 200 via the network interface unit 320 that the user authentication has failed. In this case, the controller 330 of the controlled device 300 may control the application driving unit 350 in order to prevent the requested services from being provided.

After the user is authenticated, the controller 330 searches the storage unit 370 for access control information on the authenticated user, and then controls the application driving unit 350 to provide the services requested from the control device 200 under the limited condition set in the access control information (S170).

At this time, the used time processing unit 340 updates the used time stored in the storage unit 370 to correspond to the amount of the time services have been provided through the application driving unit 350 (S180).

The illustrated process is directed to a user who is set as a target of security service, but a user group or a control device may be a target of security service through similar processes. When the control device is the target of security service, operations S130 to S160 may be omitted. In this case, the target of security service may be identified through the identification information (for example, a public key or an address of the control device) of the control device 200 obtained in the process of establishing the communication session (S110).

Figure 7:
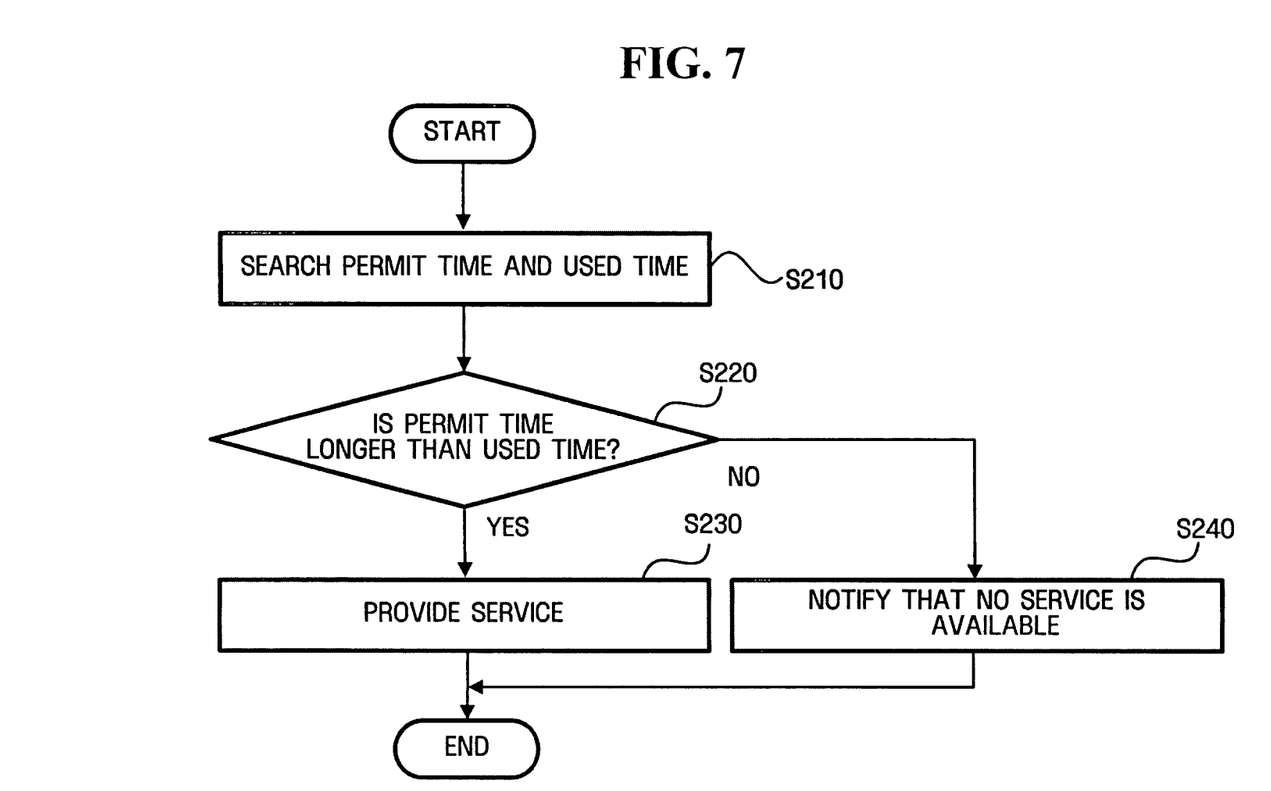
FIG. 7 is a flowchart detailing the provision of the security services of FIG. 6.

FIG. 7 is a flowchart illustrating the provision of services of FIG. 6 in more detail according to an exemplary embodiment of the present invention.

When user authentication is completed, the controller 330 of the controlled device 300 searches the storage unit 370 for permit time and used time of the authenticated user (S210).

The controller 330 compares the permit time with the used time and then determines whether to provide services requested by the user via the control device 200 (S220).

As a result, if the permit time is longer than the used time, there remains time during which the authenticated user can be given services. Accordingly, the controller 330 provides requested services via the application driving unit 350 (S230).

However, if the permit time is not longer than the used time, the authenticated user has already consumed the available time for provision of services. Accordingly, the controller 330 outputs a message stating "no services are available" to the control device via the network interface unit 320 (S240).

When services are provided, the used time is updated accordingly. Updating of the used time will be described with reference to FIG. 8.

Figure 8:
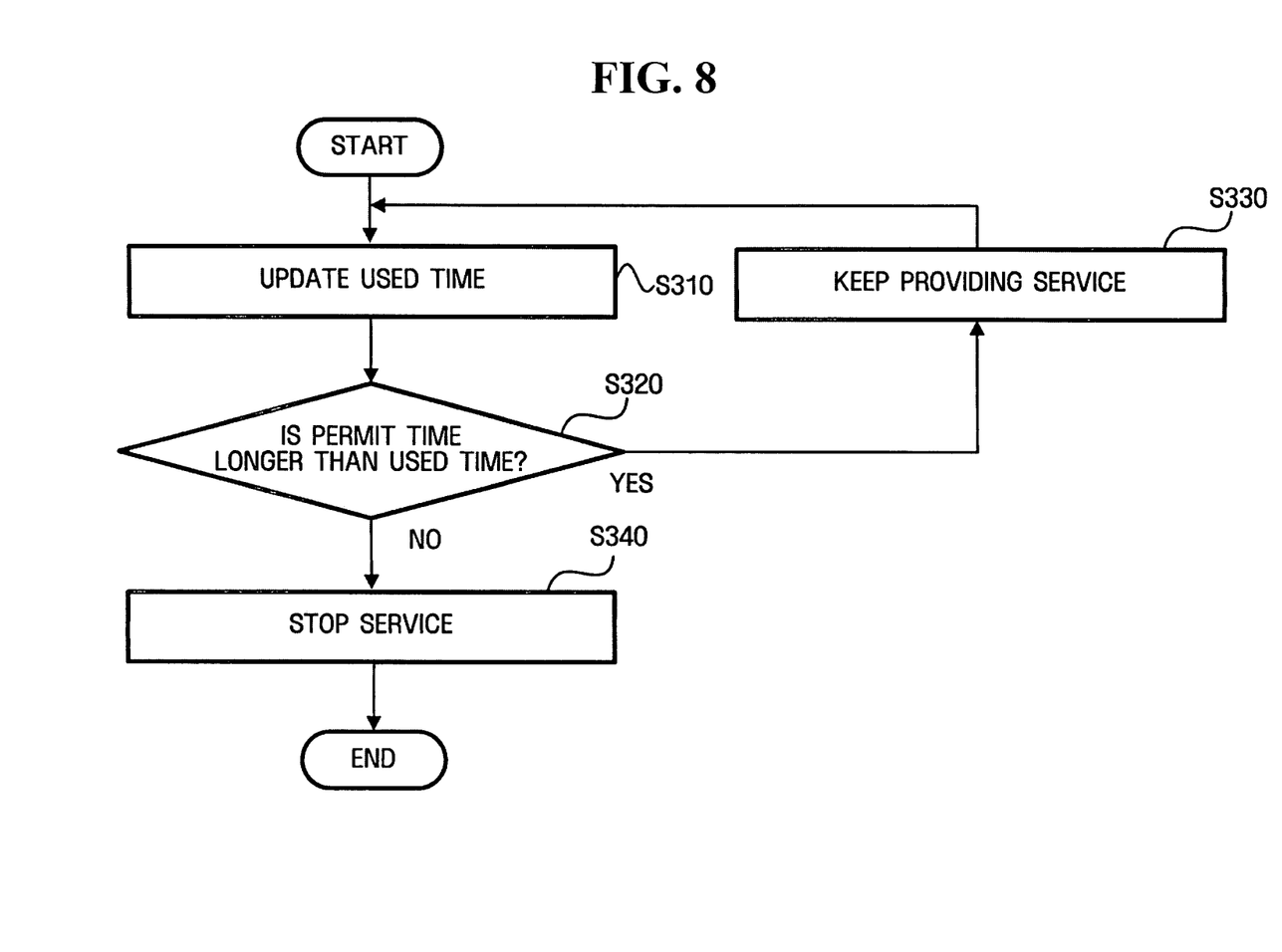
FIG. 8 is a flowchart detailing the update of used time.

FIG. 8 is a flowchart more specifically illustrating the updating of used time.

If services are provided by the application driving unit 350 through a process described with respect to FIGS. 6 and 7, the used time driving unit 340 updates the used time stored in the storage unit 370 for the user who requested the services by reflecting the accumulated time during which services were provided (S310).

When the used time is updated, the controller 330 compares the updated used time with the permit time (S320). If the permit time is longer than the used time, the controller 330 maintains the provision of services (S330). But, if the permit time is not longer than the used time, the controller 330 stops providing services by controlling the application driving unit 350 (S340).

When provision of services is stopped, the controller 330 may transmit a message stating "no services are available" to the control device 200 via the network interface unit 320.

Updating by the used time processing unit 340 of the used time and determination of whether to maintain provision of services of the controller 330 are periodically performed while the services are provided by the application driving unit 350.

Figure 9:
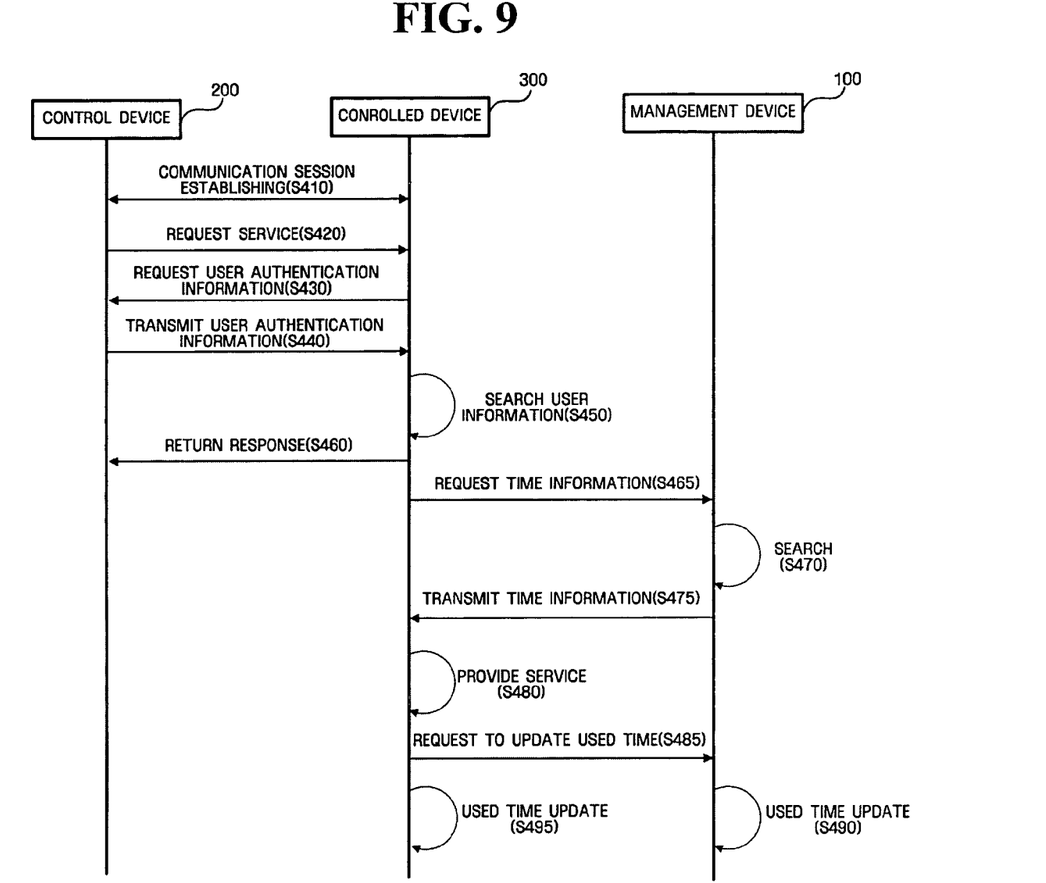
FIG. 9 is a flowchart illustrating the provision of security services according to another exemplary embodiment of the present invention.

FIG. 9 is a flowchart illustrating the security service process according to another exemplary embodiment of the present invention.

Operations S410 to S460 may be performed in the same manner as S210 to S260 of FIG. 6.

When user authentication is completed, the controller 330 of the controlled device 300 requests predetermined time information on the authenticated user from the management device 100 (S465). At this time, the requested time information may be used time and permit time of the authenticated user. As another exemplary embodiment, the requested time information may be difference value between the permit time and the used time. The used time is a total amount of time during which a target of security service is given services through each controlled device in the home network and the permit time is a total amount of time during which the target of security service is allowed to be given services through each controlled device in the home network.

When time information on the authenticated user is requested from the controlled device 300, the controller 130 of the management device 100 searches for the requested used time and permit time of the user (S470), and transmits the searched time information to the controlled device 300 via the network interface unit 120 (S475).

At this time, the transmitted time information may include the permit time and the used time, or the difference value between the permit time and the used time. This difference value is residual time available for providing services to the authenticated user.

If permit time and used time or the difference value between them is transmitted, the controller 330 of the controlled device 300 determines whether to provide services based on the transmitted time information and controls provision of services via the application driving unit 350 according to the determination (S480).

Providing services S480 may be performed in the same manner as the operations following operation S220, among a series of processes described with respect to FIG. 7. If time information transmitted from the management device 100 is the difference value between the permit time and the used time, operation S220 may be to determine whether the difference value is lager than 0. An operation to provide services S230 is performed if the difference value is larger than 0. An operation preventing the provision of services S240 is performed if the difference value is less than 0.

When services are provided through the application driving unit 350, the used time processing unit 340 may request the management device 100 to update the used time by reflecting the time during which services are provided (S485).

When a request for updating is received from the controlled device 300, the used time processing unit 140 of the management device 100 updates the used time stored in the storage unit 160 by reflecting the time during which the controlled device 300 provides services (S490).

At this time, the used time processing unit 140 of the controlled device 300 may also update the used time of the user, which is transmitted from the management device (S495).

As described with respect to FIG. 8, the update operations S495 and S490 may be periodically performed, and the controller 330 of the controlled device 300 may determine whether to continue provision of services via the application driving unit 350 through comparison of the permit time with the updated used time whenever an update is performed.

The illustrated process is directed to a user who is set as a target of security service. A user group or a control device may be a target of security service through similar processes. When the control device is the target of security service, operations S430 to S460 may be omitted. In this case, the target of security service may be identified through the identification information (for example, a public key or an address of the control device) of the control device 200 obtained in the process of establishing the communication session S410.

As described above, a system and method for providing security services according to the present invention may produce one or more of the effects described below.

Firstly, access to a controlled device may be controlled on a user basis.

Secondly, provision of services of the controlled device may be controlled based on a permit time While exemplary embodiments of the present invention have been particularly shown and described with reference to the above and the accompanying drawings, it will be understood by those skilled in the art that various changes in form and details may be made therein without departing from the spirit and scope of the invention as defined by the appended claims. The exemplary embodiments should be considered in a descriptive sense only and are not for purposes of limitation.

What is claimed is:

1. A method of providing security services in a home network system, comprising:
    establishing a communication session between a controlled device and a control device;
    after establishing the communication session, receiving, by the controlled device, from the control device a request to provide the security services while the communication session is maintained;
    requesting by the controlled device, a management device storing a permit time period for provision of the security services to a target of the security services and a used time period which is an accumulative value of time during which the security services have been previously provided to the target of the security services to provide information on the permit time period and the used time period, the controlled device storing a used time period for the target of the security services;
    receiving by the controlled device, the information on the permit time period and the used time period stored in the management device from the management device;
    providing the security services requested by the control device when the permit time period is longer than the used time period and when the request to provide the security services is received within a time period which is set in the controlled device and during which the security services are available for use;
    requesting by the controlled device, the management device to update the used time period stored in the management device by reflecting the time during which the security services requested by the control device are provided;
    updating by the management device, the used time period stored in the management device by reflecting the time during which the security services requested the control device are provided; and
    updating by the controlled device, the used time period stored in the controlled device by reflecting time during which the security services requested by the control device are provided,
    wherein the permit time period is a total amount of time during which the target of the security services is allowed to be provided with the security services, and
    wherein the target of the security services has its own used time period.

2. The method of claim 1, wherein the target of the security services refers to any one of the control device, a user who requests security services via the control device, and a user group to which the user belongs.

3. The method of claim 1, wherein the updating of the used time period is periodically performed.

4. The method of claim 1, wherein the used time period is a total amount of time during which the security services have been previously provided to the target of the security services through a plurality of controlled devices constituting a home network, and the permit time period is a total amount of time during which the target of the security services is allowed to be provided with the security services through the plurality of controlled devices constituting the home network.

5. The method of claim 3, further comprising stopping provision of the security services if the permit time period is not longer than the updated used time period.

6. A method of providing security services in a home network system, comprising:
    establishing a communication session between a controlled device and a control device, the controlled device storing a used time period for a target of the security services;
    after establishing the communication session, requesting, by the control device, the controlled device to provide the security services while the communication session is maintained;
    requesting, by the controlled device that received the request to provide the security services, a management device strong a permit time period for provision of the security services to a target of the security services and a used time period which is an accumulative value of time during which the security services have been previously provided to the target of the security services to provide information on the permit time period and the used time period;
    receiving by the controlled device, the information on the permit time period and the used time period from the management device;
    providing, by the controlled device, the security services requested by the control device if the permit time period is longer than the used time period and if the request to provide the security services is received within a time period which is set in the controlled device and during which the security services are available for use; and
    requesting by the controlled device, the management device to update the used time period stored in the management by reflecting the time during which the security services requested by the control device are provided;

updating by the management device, the used time period stored in the management device by reflecting the time during which the security services requested by the control device are provided, and updating, by the controlled device, the used time period stored in the controlled device by reflecting the time during which the security services requested by the control device are provided, wherein the permit time period is a total amount of time during which the target of the security services is allowed to be provided with the security services, and wherein the target of the security services has its own used time period.

7. The method of claim 6, wherein the target of the security services refers to any one among the control device, a user who requests security services via the control device, and a user group to which the user belongs.

8. The method of claim 6, wherein the controlled device periodically performs updating of the used time period.

9. The method of claim 6, further comprising:
searching, by the management device that received the request, the permit time period and the used time period of the target of the security services;
transmitting, by the management device, the permit time period and the used time period to the controlled device; and
comparing, by the controlled device, the received permit time period with the used time period.

10. The method of claim 8, further comprising, by the controlled device, stopping provision of the security services if the permit time period is not longer than the updated used time period.

11. The method of claim 9, wherein the used time period is a total amount of time during which the security services have been previously provided to the target of the security services through a plurality of controlled devices constituting a home network, and the permit time period is a total amount of time during which the target of the security services is allowed to be provided with the security services through the plurality of controlled devices constituting the home network.

12. An apparatus for providing security services in a home network system, comprising:
a network interface unit configured to establish a communication session with a control device and the apparatus and to transceive data between the control device and the apparatus;
a controller, configured to request a management device storing a permit time period which is a total amount of time during which a target of the security services is allowed to be given the security services and a used time period which is an accumulative value of time during which the security services have been previously provided to the target of the security services to provide information on the permit time period and the used time period, and configured to control provision of the security services requested from the control device through the network interface unit when the permit time period is longer than the used time period and when the request for the security services from the control device is received within a time period which is set in the apparatus and during which the security services are available for use, wherein after establishing the communication session, the request for the security services from the control device is received while the communication session is maintained; and a storage unit configured to store a used time period for the target of the security services; and
a used time processing unit configured to update the used time period stored in the storage unit by reflecting time during which the security services are provided and to request the management device to update the used time period stored in the management device by reflecting the time during which the security services are provided, the management device updating the used time period stored in the management device by reflecting the time during which the security services are provided in response to the request of the used time processing unit, and wherein the target of the security services has its own used time period, and wherein the apparatus, the control device and the management device are independent from each other.

13. The apparatus of claim 12, wherein the target of the security services refers to any one of the control device, a user who requests security services via the control device, and a user group to which the user belongs.

14. The apparatus of claim 12, wherein the used time processing unit periodically performs updating of the used time period.

15. The apparatus of claim 14, wherein the controller stops provision of the security services when the permit time period is not longer than the updated used time period.

16. The apparatus of claim 12, wherein the used time period is a total amount of time during which the target of the security services has been previously provided with the security services through a plurality of controlled devices constituting a home network, and the permit time period is a total amount of time during which the target of the security services is allowed to be provided with the security services through the plurality of controlled devices constituting the home network.

17. A home network system for providing security services comprising;
a control device configured to request the security services;
a management device configured to store a permit time period which is a total amount of time during which a target of the security services is allowed to be provided with the security services and a used time period which is an accumulative value of time during which the security services have been previously provided to the target of the security services;
a controlled device configured to store a used time for the target of the security services, request the management device to provide information on the permit time period and the used time period stored in the management device, receive the information on the permit time period and the used time period from the management device, provide the security services requested by the control device when the permit time period is longer than the used time period and when the request for the security services from the control device is received within a time period which is set in the controlled device and during which the security services are available for use, and update the used time period stored in the controlled device by reflecting the time during which the security services requested by the control device are provided; and wherein target of the security services has its own used time period, wherein the control device is further configured to establish a communication session with the controlled device, and then to request the security services while maintaining the communication session, wherein the controlled device is further configured to request the management device to update the used time period stored in the management device by reflecting the time during which the security services are provided, wherein the management device is further configured to update the used time period stored in the management device by reflecting the time during which the security services provided, and wherein the control device, the control device and the management device are independent from each other.

18. The system of claim 17, wherein the target of the security services refers to any one of the control device, a user who requests security services via the control device, and a user group to which the user belongs.

19. The system of claim 17, wherein the controlled device periodically performs updating of the used time period when the security services are provided.

20. The system of claim 17, wherein the used time period is a total amount of time during which the target of the security services has been previously provided with the security services through a plurality of controlled devices constituting a home network, and the permit time period is a total amount of time during which the target of the security services is allowed to be provided with the security services through the plurality of controlled devices constituting the home network.

21. The system of claim 19, wherein the controlled device stops provision of the security services when the permit time period is not longer than the updated used time period.

* * * * *